United States Patent [19]

LaCourse et al.

[11] Patent Number: 4,872,896

[45] Date of Patent: Oct. 10, 1989

[54] PROCESS FOR STRENGTHENING GLASS

[75] Inventors: William C. LaCourse, Alfred; Maysood Akhtar, Wellsville, both of N.Y.

[73] Assignee: Alfred University, Alfred, N.Y.

[21] Appl. No.: 199,954

[22] Filed: May 27, 1988

[51] Int. Cl.⁴ ............................................... C03C 21/00
[52] U.S. Cl. .................................................... 65/30.14
[58] Field of Search .................... 65/30.13, 30.14, 116, 65/33

[56] References Cited

U.S. PATENT DOCUMENTS

| | | | |
|---|---|---|---|
| 3,293,016 | 12/1966 | Cernelissey | 65/30.14 |
| 3,357,876 | 12/1967 | Rinehart | 65/30.14 |
| 3,473,906 | 10/1969 | Graham | 65/30.14 |
| 3,486,995 | 12/1969 | Evers | 501/11 |
| 3,607,172 | 11/1968 | Poole et al. | 65/30.14 |
| 3,751,238 | 8/1973 | Grego et al. | 65/30.14 |
| 3,765,855 | 10/1973 | Larrick | 65/30.14 |
| 4,012,131 | 3/1977 | Krahn et al. | 65/30.14 |
| 4,074,993 | 2/1978 | Ackerman et al. | 65/30.14 |
| 4,483,700 | 11/1984 | Forker et al. | 65/30.14 |

Primary Examiner—Peter Kratz
Attorney, Agent, or Firm—Howard J. Greenwald

[57] ABSTRACT

There is disclosed a process for strengthening a glass article. This process comprises the steps of: 1. providing a glass article comprised of from about 1 to about 30 weight percent of at least one compound of a first monovalent exchangable cation, 2. coating the surface of said glass article with a source of a second exchangable cation which has an atomic radius larger than that of the first exchangable cation, and thereafter 3. subjecting said coated glass article to a source of microwave radiation at a frequency of from about 0.9 to about 22.1 Gigaherz.

20 Claims, No Drawings

PROCESS FOR STRENGTHENING GLASS

FIELD OF THE INVENTION

A process for strengthening a glass article in which the surface of the article is exposed to a source of large cations while the article is subjected to microwave radiation.

BACKGROUND OF THE INVENTION

It is known that glass may be strengthened by ion exchange. In one process, small ions on the surface layers of glass are replaced by ions of larger size having the same electric charge. Thus, by way of illustration, sodium ions in the surface of an article made of soda-lime glass may be exchanged for potassium ions, which are larger, thereby creating compressive stresses in the surface layers and putting the inner layers under tension. In this process, to facilitate the exchange, the glass is heated; but the temperature should be kept below the strain point (the point at which the particular glass has a dynamic viscosity of $10^{14.5}$ poises).

U.S. Pat. No. 3,486,995 of Evers discloses that, in general, the ion exchange takes place by the laws of diffusion. Evers states that: "The exchange takes place when, at a given temperature, the exponential function of the rate of movement of the ions to be exchanged coincides with their constant of diffusion, but with the temperature below the transformation point...the speed of thermal diffusion is slight, and the exchange of ions progresses slowly"(see lines 49-57 of column 1).

In the conventional ion exchange processes, unless the ion exchange is allowed to progress for an inordinate amount of time, the depth of penetration of the ions will be relatively shallow. Such shallow depth of penetration causes several problems. Thus, as is disclosed in U.S. Pat. No. 3,293,016 of Cornelissen et al., the strenghtening effect obtained with shallow depth of ion exchange is not long-lived. Cornelissen states that "Generally the resulting strengthening is not permanent in normal use of the articles. By damaging the surface the obtained strengthening is largely cancelled. It has now been found that in this case too thin a surface layer has been produced which lost its effect by the damage normally done in practical use"(see lines 25-30 of column 1).

The depth of penetration can be increased by extending the time of treatment. However, as is stated in U.S. Pat. No. 3,751,238 of Grego et al., "...this expedient also greatly increases the tension in the central zone of the article. In the extreme case, this results in total disintegration of an article with explosive force when breakage occurs. Such a situation is normally highly undesirable, and a variety of methods have been suggested for its alleviation"(see from line 66 of column 1 to line 3 of column 2).

In addition to causing the problem of explosive breakage, use of a prolonged treatment time is relatively expensive. Thus, as is disclosed on page 5 of D.A. Copson's "Microwave Heating"(The Avi Publishing Company, Inc., Westport, Conn., 1962), "In the application to electronic heating, one can express the energy needed as, 2. $energy = power \times time$ where energy is defined in watt-hours, power in watts, and time in hours...."

Furthermore, long treatment times, in addition to requiring substantial amounts of energy, adversely affect productivity in large-scale commercial facilities.

With conventional ion exchange processes, suitable depths of ion exchange require hours. Thus, for example, in the ion exchange of potassium ions for sodium ions, treatment times of about 24 hours or more are usually required for the potassium ions to penetrate to a depth of from about 70 to about 100 microns.

It is an object of this invention to provide an ion exchange process for strengthening glass which, for a specified treatment time, provides substantially greater depth of ion penetration than prior art ion exchange processes.

It is another object of this invention to provide an ion exchange process for strengthening glass which, for a specified depth of ion penetration, requires substantially less time than prior art ion exchange processes.

SUMMARY OF THE INVENTION

In accordance with this invention, there is provided a process for strengthening a glass article, comprising the steps of: 1. providing a glass article comprised of from about 1 to about 30 weight percent of at least one compound of a first monovalent exchangable cation wherein said cation is selected from the group consisting of sodium, potassium, lithium, silver, copper, and mixtures thereof; 2. coating the surface of said glass article with a source of a second exchangable cation, wherein said second cation has an ionic radius larger than that of said first cation, and said second cation is selected from the group consisting of sodium, potassium, silver, copper, and mixtures thereof; and, thereafter 3. subjecting said coated glass article to a source of microwave radiation at a frequency of from about 0.9 to about 22.1 Gigaherz.

DESCRIPTION OF THE PREFERRED EMBODIMENTS

In the process of this invention, a glass material is treated. As used in this specification, the term glass refers to a noncrystaline solid. See, e.g., L.D. Pye et al.'s "Introduction to Glass Science"(Plenum Press, New York, 1972), the disclosure of which is hereby incorporated by reference into this case.

Some materials which have been made into glasses are listed on pages 12 and 13 of R.H. Doremus' "Glass Science"(John Wiley & Sons, New York, 1973), the disclosure of which is hereby incorporated by reference into this specification. In principal any substance can be made into a glass by cooling it from the liquid state fast enough to prevent crystallization.

Some illustrative glasses which may be treated with the process of this invention include, for example, silicate glasses comprised of sodium, calcium, and aluminum atoms. Thus, by way of illustration and not limitation, one may treat commercial glasses such as container glass, window glass, plate glass, phosphate glass, borate or borosilicate glass, and the like. These glasses are discussed, e.g., on page 109 of W.D. Kingery et al.'s "Introduction to Ceramics, " Second Edition (John Wiley and Sons, New York, 1976), the disclosure of which is hereby incorporated by reference into this case.

In one embodiment, the glass treated by the process of this invention is an alumino-, zircono-, or aluminozircono-silicate glass. Preferably such glass consists essentially of of from about 5 to about 25 percent of sodium oxide, from about 5 to about 25 percent of alumina and/or zirconia, and the balance being silica plus up to about 20 percent of other glass forming oxides such as magnesium oxide, potassium oxide, calcium oxide, lead oxide, boron oxide, titanium dioxide, and the like. The amounts of the optional oxides normally do not exceed about 10 percent each.

Any glass which contains one or more exchangable ions can be used in this process. It is preferred that the exchangable cation in the glass be monovalent. Furthermore, it is also preferred that the exchangable ion be selected from the group consisting of lithium, potassium, and sodium ions. In the most preferred embodiment, the exchangable ion is sodium ion.

The preferred glasses treated in the process of this invention generally are comprised of from about 50 to about 85 weight percent of silica, from about 1 to about 20 weight percent of alumina, from about 5 to about 20 weight percent of calcium oxide, and, additionally, from about 1 to about 30 weight percent of a compound of a monvalent cation selected from the group consisting of sodium, potassium, lithium, silver, copper, and mixtures thereof. It is preferred that the composition contain from about 5 to about 20 percent of the compound of monovalent cation. In addition to the silica, the alumina, and the calcium oxide, and the compound of the monovalent or divalent cation, the glass may also be comprised of at least one of the following ingredients: magnesium oxide, barium oxide, boron oxide, and the like. These glass compositions are described in D.R. Uhlman et al.'s "Glass Science and Technology," Volume 1, "Glass Forming Systems"(Academic Press, New York, 1983), the disclosure of which is incorporated by reference into this specification.

In one preferred embodiment, the glass is a soda lime silicate glass which preferably contains from about 65 to about 75 perent of silica, from about 0.5 to about 5.0 percent of alumina, from about 5 to about 15 weight percent of calcium oxide, and at least additional ingredient selected from the group consisting of about 3 to about 18 weight perent of an oxide selected from the group consisting of sodium oxide, potassium oxide, and lithium oxide.

In one embodiment, the coated soda lime silicate is at a temperature of above 500 degrees centigrade while it is subjected to microwave radiation.

Any glass article or frit of any shape or size can be treated by the process of this invention. By way of illustration and not limitation, one may treat glass containers, rods, microscope slides, flat glass plates, lenses, fibers, spheres, and the like. In one preferred embodiment, the glass object to be treated is a glass container. In another preferred embodiment, the glass object is flat glass.

In the first step of the process of this invention, the surface of the glass article is coated with a source of exchangable ion. One may coat less than the entire surface of the article; thus, e.g., with a glass container one might choose to coat only the outside surface. Thus, e.g., with a flat glass article one might choose to coat only one side. However, it is generally preferred to coat the entire surface of the glass article.

As used in this specification, the term coated refers to the state the glass article is in after part or all of its surface has been contacted with the coating medium. Thus, e.g., a glass article which is dipped into a coating medium and withdrawn is coated; its surface is in contact with the coating medium. Similarly, a glass article which is immersed in the coating medium is also coated within the meaning of this specfication.

The source of the exchangable ion which is used to coat the glass article must provide a larger ion than that which is present in the glass. Thus, if the exchangable ion in the glass is lithium (with a radius of about 0.65 angstroms), one can provide either a source of sodium ion (having a radius of about 1.0 angstrom) and/or potassium ion (having a radius of about 1.35 angstroms) and/or rubidium ion, cesium ion, silver ion, thallium ion, and the like. If the exchangable ion in the glass is sodium, one must use a larger ion such as, e.g., potassium. Those skilled in the art can, by reference to standard handbooks of chemistry and physics, determine the ionic radii of various ions.

The ion source coated on the glass article may be in the form of a liquid and/or a powder. Such ion source may be applied by immersing and withdrawing the article in a bath of the source, by spraying the ion source onto the article, painting the ion source onto the article, subjecting the article to a fluidized bed comprised of the ion source, etc.

In one embodiment, a molten salt bath is used as the source of the larger exchangable ion. In this embodiment, it is preferred to use a salt or salt mixture that becomes molten at or below the strain point of the glass such as, e.g., potassium dichromate, a eutectic mixture of 52 percent potassium chloride and 48 percent potassium sulfate, and potassium nitrate-potassium sulfate mixtures. Other potassium salts or salt mixtures which are molten in the range of the treatment temperatures and which do not chemically attack the glass surface at such temperatures may also be used in this embodiment.

In another embodiment, molten salt comprised of potassiium ion is poured over the glass article.

It is desired that the ions from the ion source penetrate the surface of the article to a depth of from about 10 to about 100 microns. Thus, as those skilled in the art are aware, one will use a sufficient amount of coating material to furnish ions sufficient for the desired depth of penetration. In general, the ion source is present on the surface of the glass article in a thickness of from about 0.1 to about 1 millimeter.

Suitable sources of exchangable ions include, e.g., potassium nitrate, potassium sulfate, potassium pyrosulfate, potassium carbonate, potassium chloride, potassium fluoride, potassium phosphate, the sodium compounds corresponding to said anions, mixtures thereof, and the like. Other analagous alkali metal compounds may also be used. Mixtures of said compunds also may be used. In one embodiment, the glass article to be treated is immersed in a molten salt bath of the ion source. The particular ion source used will be a function of the final properties desired in the glass article and its ability to interact with the source of microwave energy. In another embodiment, the salt is not molten but, nonetheless, provides the exchangable ion required for the process.

In one embodiment, the preferred source of ions is selected from the group consisting of potassium nitrate and potassium pyrosulfate.

In one embodiment, an aqueous solution of dipotassium hydrogen orthophosphate is applied to a soda glass article at temperatures sufficient to vaporize the water and thereby deposit the potassium salt as a coating on the article.

When the glass article is a container, it is preferred that one coat the ion source onto the container before subjecting the article to microwave energy. In another embodiment, the glass article is immersed in a liquid bath containing the ion source while being subjected to microwave energy.

As used in this specification, the term microwave refers to an electromagnetic wave with a frequency from about 0.9 to about 221 Gigaherz. Thus, the Federal Communications Commission has provided certain microwave frequencies for industrial, scientific, and medical (ISM) uses. These frequencies are 915 plus or minus 25, 2,450 plus or minus 50, 5,800 plus or minus 75, and 22,125 plus or minus 125 megacycles per second. Frequencies other than these FCC assigned frequencies within the aforementioned range also can be used.

The microwave frequency in most common use today is 2,450 megacylces per second. Inasmuch as most microwave equipment is designed to operate at this frequency, it is preferred to use it in the process of this invention. It is to be understood, however, that other microwave frequencies also can be used.

The coated article is subjected to microwave energy for a time sufficient to allow the ion(s) in the coating to penetrate the article to a depth of from about 10 to about 100 microns. After the article has been treated, it can be subjected to standard elemental analysis to determine the depth of penetration.

It is preferred to expose the coated article to sufficient microwave radiation so that the exchangable ion penetrates the article to a depth of from about 25 to about 75 microns. In a more preferred embodiment, the depth of penetration is least about 50 microns.

When subjecting the coated article to the microwave radiation, it is preferred that the article be maintained at a temperature below its strain point. The term strain point, and other terms used in this specification, are defined in ASTM Test Designation C336-64T, the disclosure of which is hereby incorporated by reference into this specification.

Because the ion exchange process of this invention is so much faster than those of prior inventions, it is possible to conduct part or all of the process above the strain point of the glass. However, it is preferred to conduct the process such that the glass article does not have its viscosity exceed $10^{12}$ for a period exceeding about one minute.

In one embodiment, the glass article is a soda lime silicate glass. In this embodiment, it is preferred not to subject the article to microwave energy for a period exceeding 20 minutes. The preferred treatment time is from about 3 to about 10 minutes.

After the glass article has been subjected to microwave radiation, its is preferred to allow it to cool and thereafter to remove the salt coating from the glass by conventional means such as those described in, e.g., U.S. patent 3,473,906 of Graham. The disclosure of said Graham patent is hereby incorporated by reference into this specification.

The following examples are presented to illustrate the claimed invention but are not to be deemed limitative thereof. Unless otherwise specified, all parts are by weight and all temperatures are in degrees centigrade.

EXAMPLE 1

Ten commerical glass soda lime silicate rods, sold under the name of "Kimbale R6 Standard Flint"(obtained from OI Corporation of Toledo, Ohio) with a nominal diameter of 4 millimeters and a strain point of about 495 degrees centigrade were used in this experiment.

Potasssium pyosulfate was dissolved in water to produce a saturated solution. The glass rods were dipped into the saturated solution so that each of them was momentarily immersed in it and then removed. The coated rods were then put onto a ceramic support and inserted into a commercial microwave oven (Amana Radar Range with a 750 watt rating).

The microwave oven was then turned on, exposing the coated samples to microwave energy of 2.45 Gigaherz frequency for 5 minutes. Thereafter, the rods were removed from the oven, allowed to cool, and analyzed for strength.

Strength analysis was conducted in accordance the conventional three-point bend test using a two-inch span on an Instron model 1123 testing machine.

The treated sample of this invention had an average strength of 189 megapascals, a minimum strength of 139 megapasacls, and a maximum stgrength of 228 megapascals. The standard deviation for the ten samples was 26 megapascals.

EXAMPLE 2

The procedure of EXAMPLE 1 was substantially followed with the exceptions that the glass rods were neither dipped into a coating medium nor subjected to microwave radiation. The average strength of these rods was 118 megapascals, the minumum strength was 69 megapascals, the maxmimum strength was 163 megapascals, and the standard deviation for the samples was 20 megapascals.

EXAMPLES 3-5

The procedure of EXAMPLE 1 was substantialy followed with the exception that, during the exposure to the mirowave energy, the glass rods were kept fully immersed in the potassium pyrosulate bath. In EXAMPLES 3, the rods were subjected to 3 minutes of microwave radiation. In EXAMPLE 4, the rods were subjected to 4 minutes of microwave radiation. In EXAMPLE 5, the rods were subjected to 7 minutes of microwave radiation.

The rods of EXAMPLE 3 had an average strength of 186 megapascals, a minimum strength of 114 megapascals, and a maximum strength of 241 megapascals; and the standard deviation of the ten samples was 32 megapascals.

The rods of EXAMPLE 4 had an average strength of 233 megapascals, a minimum strength of 202 megapascals, a maximum strength of 253 megapascals; and the standard deviation of the ten samples was 19 megapascals.

The rods of EXAMPLE 5 had an average strength of 150 megapascals, a minimum strength of 123 megapascals, and a maximum strength of 173 megapascals; and the standard deviation of the ten samples was 16 megapascals.

EXAMPLE 6

The procedures of EXAMPLES 3-5 were substantially followed with the exception that a molten bath of potassium nitrate was used as the coating medium and the samples were exposed to microwave radiation for five minutes.

The average strength of the treated samples of this experiment was 210 megapascals, the minimum strength was 163 megapascals, and the maximum strength was 261 megapascals; and the standard deviation for the ten samples was 30 megapascals.

In one embodiment of this invention, a process for strengthening glass involving ion exchange is provided. In the first step of this process, a glass comprised of a compound containing an exchangable monovalent ion is provided. In the second step of this process, a compound comprised of a smaller exchangable cation is coated onto part or all of the surface of the glass. In the third step of this process, ion exchange of the large ion from the glass with the small ion of the coating is effected by heating the glass above its strain point while subjecting it to microwave radiation at the frequency described above. In the fourth step of this process, the glass is cooled from above the strain point to ambient. The coating material is then removed from the surface of the glass.

In one embodiment of this invention, the index of refraction of a glass article is modified by either exchanging a larger for a smaller cation (in accordance with applicants' claimed process) or by exchanging a smaller for a larger cation (in accordacne with the process described immediately above). In both cases, microwave energy is used to facilitate the ion exchange after the article to be treated has been coated with a source of one or more exchangable cations. In both cases, suitable exchangable cations are chosen for the glass composition and the coating material so that the desired index of refraction is obtained. In one aspect of this embodiment, after the ion exchange on the surface of the glass article has been facilitated with micowave energy, the article is then heated without the presence of microwaves to further alter the index of refraction. In another aspect, the article is first so heated and then subjected to microwave radiation. This process may be utilized to prepare graded index lenses and/or fiber optic preforms and/or optical waveguides.

In another embodiment of this invention, which is especially useful with sodium aluminosilicate glasses, ion exchange is first conducted in accordance with the claimed process and, thereafter, the glass is then heated to a temperature sufficient to cause crystallization of glass surface. This process improves the strength of the glass.

In another embodiment of this invention, a crystalline rather than a vitreous material is subjected to ion exchange facilitated by microwave energy in accordance with the claimed process. In this embodiment, substrates such as lithium aluminosilicates, sodium aluminosilicates, and other crystalline ceramic materials may be treated in order to modify their surface characteristics. Ion exchange of either a smaller for a larger cation or a larger for a smaller cation may be effected.

In another embodiment of this invention, any of the exchange processes described herein can be used with exchangable anions rather than cations.

In another ebodiment, the exchangable ions may be of substantialy the same size or or different size. Alternatively, in this embodiment, no exchangable ions are present in either the glass and/or the coating. In this embodiment, the glass is heated to a temperature sufficient to melt its surface and heal flaws in the surface. This process is preferably conducted in the presence of the specified microwave radation to facilitate the healing process, and it is preferred to use a coating material which will act as a microwave susceptor.

In another embodiment, the glass article is coated with a glaze frit with a different coefficient of expansion than the glass article and thereafter the coated article is subjected to the specfied microwave energy to fire the glaze frit onto the substrate. In this embodiment, one can--but need not--use microwave susceptors. In another aspect, the glaze frit may be replaced by a sol-gel-derived-coating, and the coating is bonded to the glass surface by the microwave radiation. In the aspect using the frit and the sol-gel coating, one may apply a second coating to the glass surface, such as glaze, sol-gel-derived coating, a coating comrpised of compound with monovalent exchangable ion as described above, combinations thereof, and the like. This application of this second coating facilitates rapid heating of the glass article and/or alters the chemical composition of the first coating. This process may be repeated to continually modify the properties of the coated article.

In another embodiment of this invention, a small ion is exchanged for a large ion in the glass surface in the presecne of microwave radiation. A suitable choice of the exchangable ions and the temperature will result in cracking of the glass surface. Thereafter, once the cracked surface has formed (or during its formation), other ions may be introduced into the cracks in order to cause changes in the chemical compositon of the glass surface. Thus, in one example, lithium is exchanged for sodium ion in a soda lime silicate glass, thereby causing cracking. this can be done in the presecne of silver ions, or the silver ions may be applied subsequent to the fomration of the cracks and allowed to penetrate the cracks by diffusion. Microwave radiation is preferably used to facilitate the ion exchanges and cracking. In one embodiment, heat but no microwave radiation is used.

It is to be understood that the aforementioned description is illustrative only and that changes can be made in the apparatus, the ingredients and their proportions, and in the sequence of combinations and process steps as well as in other aspects of the invention discussed herein without departing from the spirit and scope of the invention.

We claim:

1. A process for strengthening a glass article, comprising the steps of:
   (a) providing a glass article comprised of from about 1 to about 30 weight percent of at least one compound of a first monovalent exchangable cation wherein said cation is selected from the group consisting of sodium, potassium, lithium, silver, copper, and mixtures thereof;
   (b) coating the surface of said glass article with a source of a second cation, wherein:
   said second cation has an ionic radius larger than that of said first cation, and
   2. said second cation is selected from the group consisting of sodium, potassium, silver, copper, and mixtures thereof; and, thereafter
   (c) subjecting said coated glass article to a source of microwave radiation at a frequency of from about 0.9 to about 22.1 Gigaherz, whereby said second cation is caused to penetrate the surface of said glass article to a depth of from about 10 to about 100 microns.

2. The process as recited in claim 1, wherein said glass article is comprised of from about 50 to about 85 weight percent of silica, from about 1 to about 20 weight percent of alumina, and from about 5 to about 20 weight percent of calcium oxide.

3. The process as recited in claim 2, wherein said glass article is a soda lime silicate glass article.

4. The process as recited in claim 3, wherein said soda lime silicate glass article is comprised of from about 65 to about weight 75 weight percent of silica, from about 0.5 to about 5.0 percent of alumina, and from about 5 to about 15 weight percent of calcium oxide.

5. The process as recited in claim 4, wherein soda lime silicate glass article is comprised of from about 3 to about 18 weight percent of an oxide selected from the group consisting of sodium oxide, potassium oxide, and lithium oxide.

6. The process as recited in claim 5, wherein said oxide is sodium oxide.

7. The process as recited in claim 6, wherein said second cation is potassium ion.

8. The process as recited in claim 7, wherein said source of potassium cation is selected from the group consisting of potassium nitrate, potassium sulfate, potassium pyrosulate, potassium chloride, potassium fluoride, potassium phosphate, and mixtures thereof.

9. The process as recited in claim 8, wherein said microwave energy is at a frequency of about 2.45 Gigaherz.

10. The process as recited in claim 9 wherein, while said coated object is being subjected to microwave radiation, it is maintained at a temperature above its strain point.

11. The process as recited in claim 9, wherein, while said coated object is being subjected to microwave radiation, it is maintaned at a temperature below its strain point.

12. The process as recited in claim 11, wherein said source of potassium cation is potassium nitrate.

13. The process as recited in claim 12, wherein, while said coated article is being subjected to microwave radiation, its viscosity does not exceed $10^{12}$ poise for a period exceeding one minute.

14. The process as recited in claim 13, wherein said coated article is subjected to microwave energy for a period not exceeding 20 minutes.

15. The process as reicted in claim 14, wherein said coated article is subjected to microwave radiation for a period of from about 3 to about 10 minutes.

16. The process as recited in claim 11, wherein said source of potassium ion is potassium pyrophosphate.

17. The process as recited in claim 15, wherein said coated article is subjected to microwave radiation for a period of about 3 minutes.

18. The process as recited in claim 15, wherein said coated article is subjected to microwave radiation for a period of about 4 minutes.

19. The process as recited in claim 15, wherein said coated article is subjected to microwave radiation for a period of about 5 minutes.

20. The process as recited in claim 15, wherein said coated article is subjected to microwave radiation for a period of about 7 minutes.

* * * * *